Figure 11:
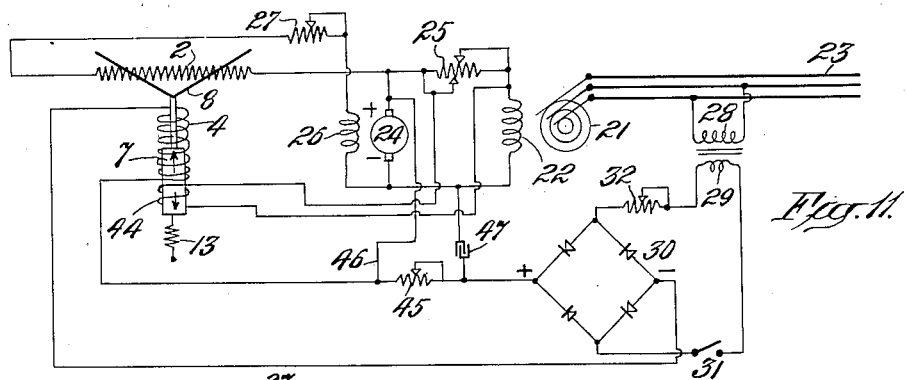

Oct. 13, 1942.                F. G. LOGAN                 2,298,536
                     ELECTRIC CONTROLLING APPARATUS
                     Filed Jan. 18, 1939         6 Sheets-Sheet 1
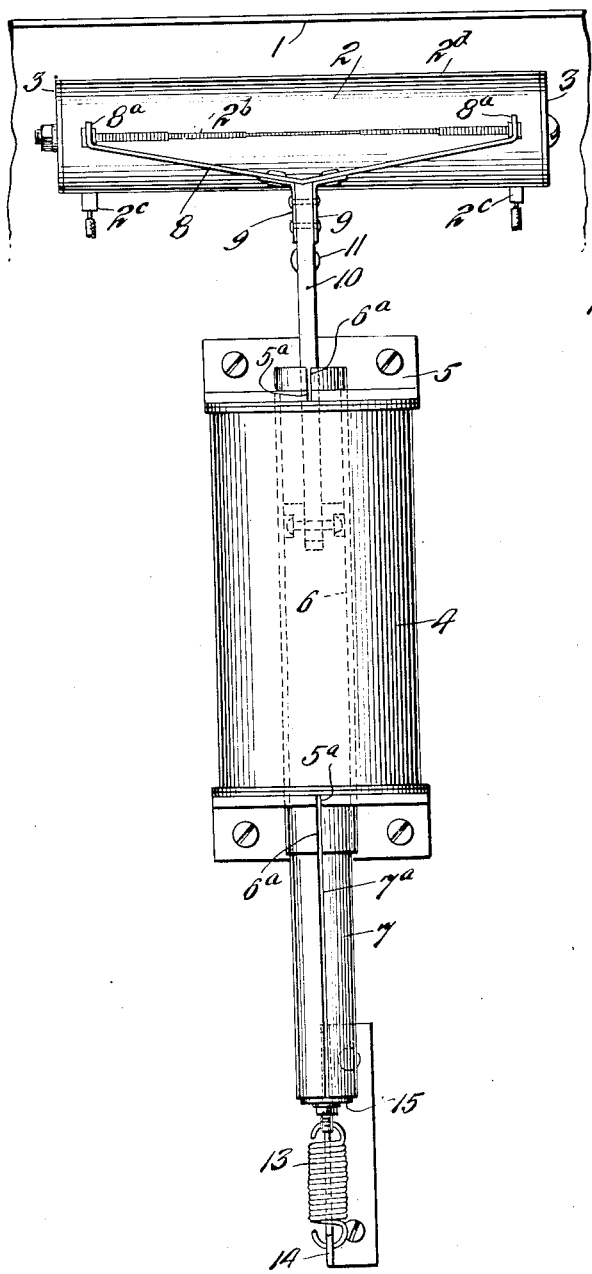
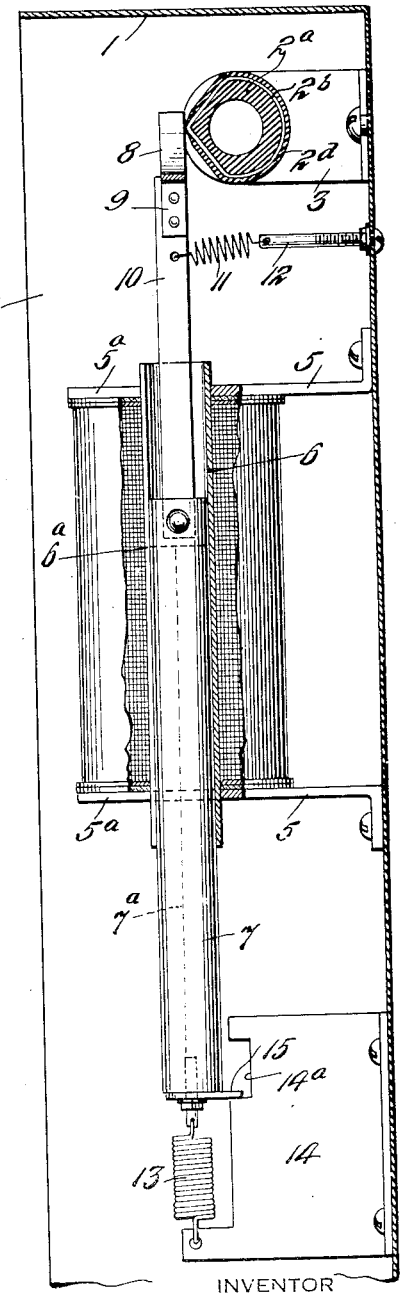
INVENTOR
FRANK G. LOGAN
BY
Lawrence K. Sager
his ATTORNEY

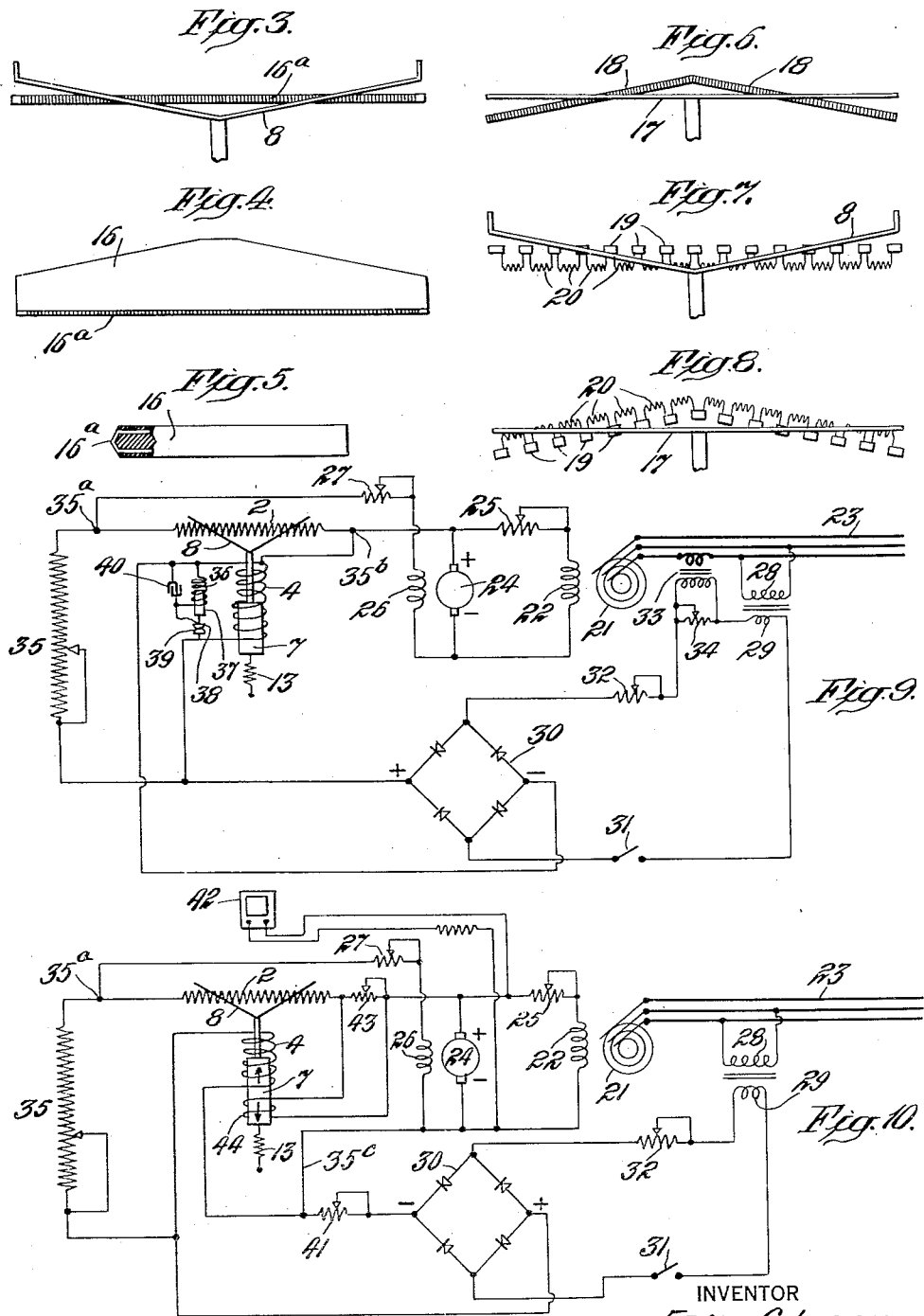

Oct. 13, 1942.                F. G. LOGAN                2,298,536
                    ELECTRIC CONTROLLING APPARATUS
                    Filed Jan. 18, 1939          6 Sheets-Sheet 3

INVENTOR
FRANK G. LOGAN
BY
Lawrence K. Sager
his ATTORNEY

Oct. 13, 1942.  F. G. LOGAN  2,298,536
ELECTRIC CONTROLLING APPARATUS
Filed Jan. 18, 1939        6 Sheets-Sheet 4

INVENTOR
FRANK G. LOGAN
BY
Lawrence K. Sager
his ATTORNEY

Oct. 13, 1942.   F. G. LOGAN   2,298,536
ELECTRIC CONTROLLING APPARATUS
Filed Jan. 18, 1939   6 Sheets-Sheet 5

INVENTOR
FRANK G. LOGAN
BY
Lawrence K. Sager
his ATTORNEY

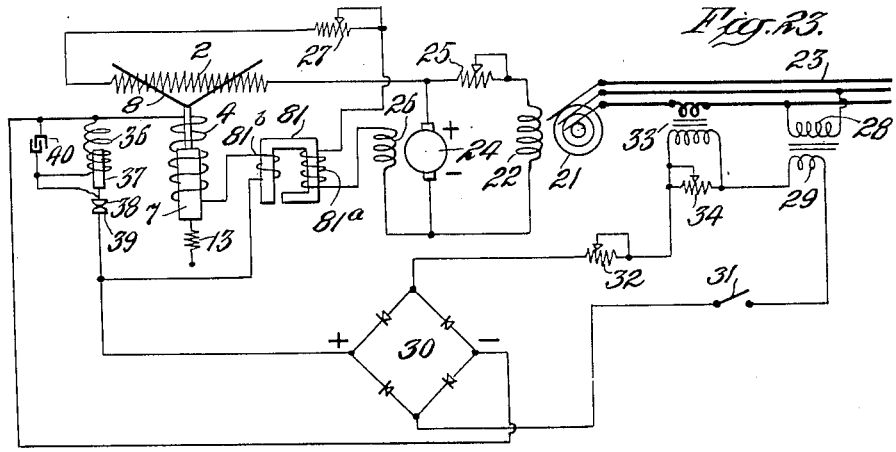
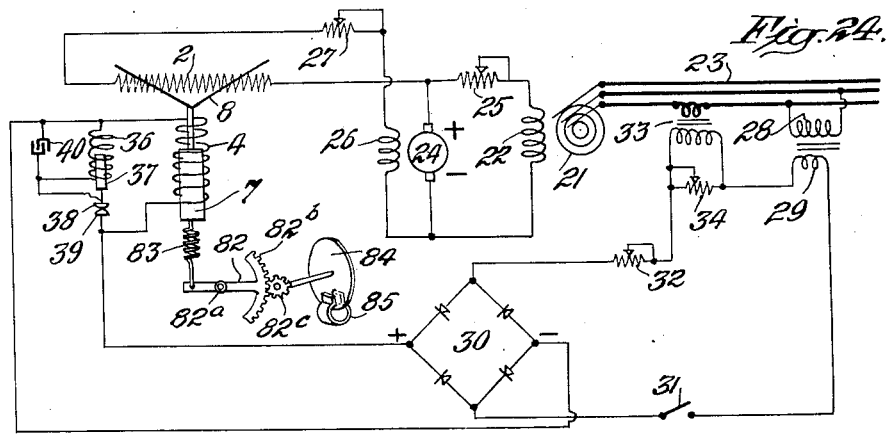
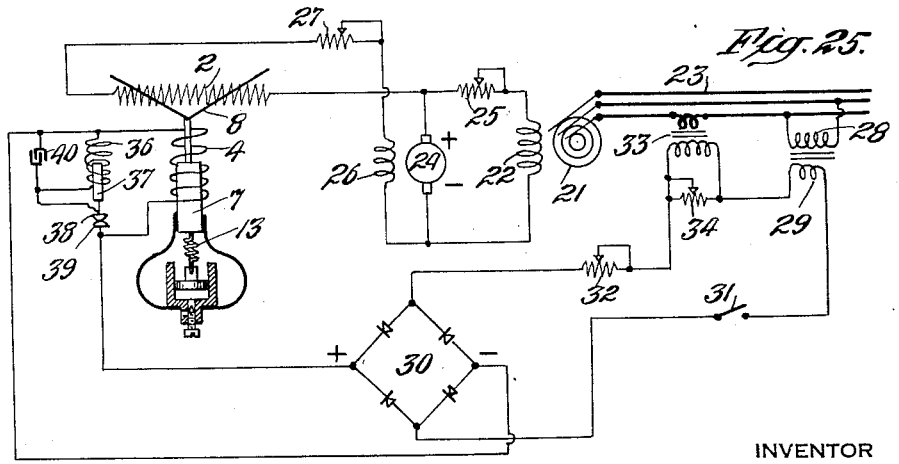

Patented Oct. 13, 1942

2,298,536

UNITED STATES PATENT OFFICE 2,298,536

ELECTRIC CONTROLLING APPARATUS

Frank G. Logan, Mount Vernon, N. Y., assignor to Ward Leonard Electric Company, a corporation of New York Application January 18, 1939, Serial No. 251,468

9 Claims. (Cl. 171—229)

This invention relates to improved means and methods of control for dynamo-electric machines, such as the output voltage of a generator regardless of the change of load or the speed of an electric motor. The invention has many other uses and various applications and is subject to many modifications.

Certain disclosures of this application not claimed herein are described and claimed in Patent No. 2,266,222 granted December 16, 1941, on my application Serial No. 308,341, filed December 9, 1939, a division of this application.

The main objects of the invention are to provide a simple and inexpensive form of construction of the automatically adjustable type which will be dependable in operation, rugged and compact in structure, not easily affected by tilt or shock and adapted to withstand severe service with a minimum amount of attention. Another object is to maintain the regulation within comparatively close limits such as may be desirable for many practical uses where an extremely high degree of accuracy of control is not required. Another object is to provide a structure which will apply a pronounced corrective factor quickly in variable amounts when needed to overcome any sudden change of conditions and to accomplish this by a comparatively small movement of the movable element.

Another object is to provide a wiping contact between the movable element and resistance contacts and a proper amount of contact pressure which will avoid objectionable wear of the parts while maintaining the contacts clean and insuring good contact and long life without sparking. Another object is to provide a form of relative movement between the resistance contacts and the movable element which will be along the contacts instead of across them which reduces the friction and wear of the parts and heightens the smoothness of control. Another object is to permit the movable element to remain at rest as regards the controlling action except at such times as response is necessary and thereby avoid the constant regulating movement required in some forms of regulators with the resulting objections thereto.

A further object is to avoid the use of mechanical dampers with their resulting sluggish action. By the present invention the regulator is permitted to freely respond to the initial impulse and momentarily over-correct by applying a rapid transient corrective factor and is then brought quickly to its proper position by use of an electrical anti-hunting impulse. This aids in securing a prompt response and correction when any change in conditions occurs. Another object is to overcome the friction of repose of the parts so that when movement from rest is necessary, the regulator will move readily and smoothly and thus further increase the sensitiveness of response. Another object is to provide simple means for any desired degree of compounding when required. Other objects and advantages of the invention will be understood from the following description and accompanying drawings showing preferred embodiments of the invention.

Figure 20:
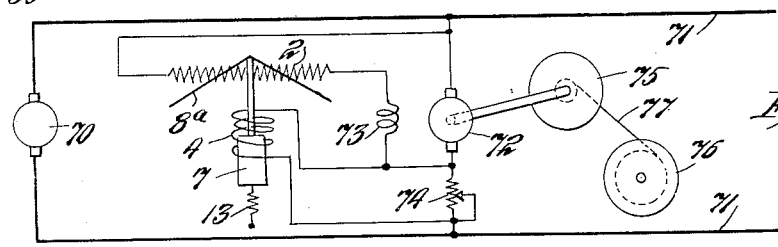
Figure 21:
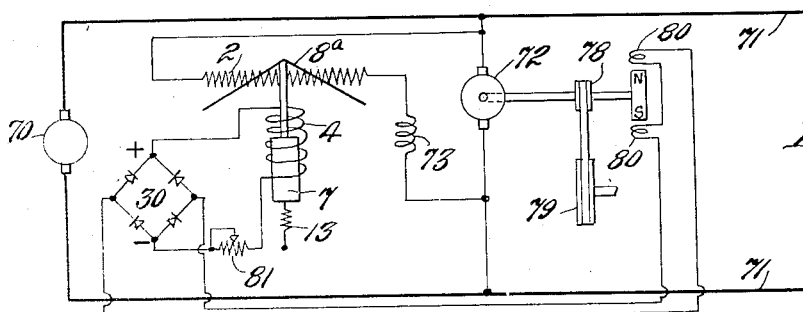

Fig. 1 is a front elevation of the controlling device and adjustable resistance of the regulator; Fig. 2 is a side view partly in section; Figs. 3, 4 and 5 are front plan and side views showing a different form of resistance unit; Fig. 6 is a front view of the movable contact and resistance element showing a different form; Figs. 7 and 8 are similar views showing a form of resistance and contacts adapted for heavy duty; Fig. 9 is a diagram showing the parts and connections of one form of apparatus for regulating the voltage of of a generator; Figs. 10 to 19 are similar diagrams showing various modifications and applications; Figs. 20 and 21 are diagrams of apparatus for controlling the speed of an electric motor; and Figs. 22 to 25 are diagrams similar to Fig. 9 except they show different forms of damping means.

Referring to Figs. 1 and 2, the parts are enclosed by and mounted on the back of a casing 1. The regulating resistance element 2 is in the form of a tube extending horizontally across the top portion of the casing. It is composed of a tube 2a of insulating refractory material, such as porcelain, on which are wound many turns of the resistive conductor 2b connected to terminals 2c at the ends of the tube. The resistive conductor and terminals, except where exposed for connection to an external circuit, are covered with a coating 2d of insulating material, such as vitreous enamel. The tube is supported at the end by sheet metal brackets 3 which in turn are fastened to the back of the casing. The tube, as shown in Fig. 2, is wedge-shaped to form a forwardly projecting edge. After enameling, the enamel covering the front edge is ground off so as to expose a portion of each turn of the resistive conductor at the front edge of the tube. This provides a smooth contacting surface for engagement by the movable element. The exposure of a portion of each adjoining turn of the resistive conductor provides a large number of steps for refined adjustment of the amount of resistance inserted in the control circuit. The tube may be wound with a resistive conductor of small size at the middle portion and of larger sizes as the outer ends of the tube are approached, as indicated in Fig. 1, in order to secure greater change in resistance between the turns of the central portion than between turns of the outer portion for the purpose of securing desired quantitative control.

Below the resistance unit is mounted the controlling electromagnet or solenoid having a vertical coil 4 with supporting brackets 5 of sheet metal at the upper and lower ends which are in turn secured to the back of the casing 1. The solenoid coil is wound upon a brass tube 6 to which the brackets 5 are fixed. The tube projects above and below the controlling coil and serves to guide the plunger 7 of magnetic material. The tube is slotted throughout its length in a vertical direction, as shown at 6a, for the purpose of reducing eddy currents; and the supporting brackets 5 are likewise slotted as shown at 5a for the same purpose.

The movable element 8 which contacts with the exposed front edge of the resistance unit is in the form of a conducting strip, such as metal, the inner edge of which contacts with the exposed portions of the turns of the resistance unit. It is of a widely open V form with the ends 8a extending upward vertically. It is preferably made of silver, or alloy of silver for insuring good contact with the turns of the resistive conductor but may, if desired, be made of a baser metal with the contacting portion of silver or of silver alloy. At the central apex of the contacting element 8 are secured brackets 9 which engage the opposite sides of a connecting strip 10 of insulating material. This strip extends downwardly into the coil 4 and is pivotally connected to the upper end of the plunger 7. The plunger 7 may be slotted longitudinally from the center outwardly as shown at 7a for reducing the induction of eddy currents.

The proper contact pressure of the movable element 8 against the contact edge of the resistance tube is imposed by a spring 11 secured at one end to the upper part of the strip 10 and at the other end to the end of a screw 12 which is fixed to and projects forwardly from the back of the casing. A spring 13 is secured to the lower end of the plunger 7 and to a sheet metal plate 14 which is fixed to the back of the casing. This spring exerts a downward pull upon the plunger 7 and supplements the force of gravity tending to hold the same in its lowest position. At the lower end of the plunger is secured a small plate 15 which projects towards the back of the casing into a cutaway portion 14a of the plate 14. The plate thus serves as a stop for the plunger in its lowest and highest positions.

When the plunger is in its lowest position as shown in Figs. 1 and 2, the outer ends of the contacting element 8 are in engagement with the exposed portions of the terminal bands 2c and thereby short circuits all of the resistance of the tube 2. When the current in the coil 4 is increased, the plunger 7 is raised against gravity and the pull of the spring 13 and this action gradually reduces the short circuited portion of the resistive conductor; and when the plunger is in its highest position with the plate 15 against the upper stop, the middle of the element 8 is in engagement with the middle of the resistive conductor, at which time almost none of the resistance is short circuited by the element 8 and it is practically all inserted in the circuit to which the resistive conductor is connected. By this form of construction the distance of travel of the plunger and contacting element 8 is comparatively short by reason of the wide open V form of the movable element. This small range of movement from the resistance-all-out position to the resistance-all-in position insures a pronounced change of resistance with a comparatively small movement of the plunger and consequently imposes an adequate corrective change of resistance upon comparatively small change of current in the solenoid coil. Also, the multiplicity of contacts of the exposed portion of the resistive conductor secures refined control of the resistance upon any movement of the contacting element. The direction of movement of the element 8 over the exposed surface of the resistive conductor is always in the direction of the turns of the resistive conductor and not across them, securing a wiping contact with a minimum of frictional wear, while the spring 11 insures adequate and uniform contact pressure in all positions of the controlling element. Furthermore, the weight of the movable parts is comparatively light permitting quick response of movement to any change of current and the low inertia likewise permits the movable portion of the system to quickly adjust itself to its correct position under any conditions of operation.

The form of construction may be changed to suit particular requirements and Figs. 3 to 8 show some of the modified forms which may be used for special purposes. Figs. 3 to 5 show a form of contact resistance element similar to that shown in Figs. 1 and 2 except that the resistive conductor is wound in the form of a flat plate 16 having a front contacting straight edge 16a where portions of the successive turns of the resistive conductor are exposed for engagement by the movable element 8. As shown in Fig. 4 the rearwardly extending portion of the plate may be made converging to permit the same size of resistive conductor to be used throughout its length, the shorter length of the turns at the ends securing a less change of resistance per turn near the end portion than is secured at the central portion of the plate.

Fig. 6 shows the shape of the parts reversed from that of Figs. 1 and 2. In Fig. 6 the movable contact element 17 is in the form of a straight strip or bar whereas the exposed contacting face 18 of the successive turns of the resistive conductor is of an inverted V-shape with widely diverging sides. Such a form of resistance element may be made by combining two flat plates meeting at the apex as shown in Fig. 6, or by similarly combining other forms of resistance units such as the tubular form of Figs. 1 and 2.

Fig. 7 indicates a form particularly appropriate for use where the control of comparatively large current is necessary. Here there is a straight row of contacts 19 with resistive conductors 20 connected between successive contacts, the resistive wires being preferably covered with an insulating coating from which the contacts 19 project, as in the usual forms of plate rheostats. Fig. 8 is similar to Fig. 7 except that the movable contacting element 17 is in the form of a straight bar or strip, while the contacts 19 are arranged to form an inverted widely diverging V. It is evident that in each of these modifications the resistance is all short circuited when the movable contacting bar or strip is in its lowest position and is all inserted when in its upper position.

Instead of making the contacting bar or the contacts of V formation, they could be arc shaped or of bow form or of any other equivalent form to secure the same results; and the description as of V form in the claims is to be understood as covering such equivalents.

Fig. 9 shows the connections and relationship of the complete controlling apparatus for regulating the voltage of an alternating current generator having a separate exciter for supplying current to its field winding. The generator 21 is shown having a field winding 22 and supplying current to the mains 23. The direct current exciter is shown having its armature 24 supplying current to the field winding of the generator through an adjustable resistance 25. The field winding 26 of the exciter is connected in series with an adjustable resistance 27 and with the regulating resistance 2, across the brushes of the armature 24. The movable contacting element 8 is adapted to engage the exposed portions of the turns of the resistance element 2 in the manner already explained. Across a pair of the mains 23 is connected the primary 28 of a potential transformer having a secondary 29, the current from which is supplied to a rectifier 30. This rectifier may be of any form or type but is indicated as of the copper oxide contact type connected in bridge form. In series with the secondary 29 is a switch 31 and an adjustable controlling resistance 32.

Where compounding is desired, a current transformer 33 is provided having its primary connected in series with one of the mains 23 and its secondary connected across an adjustable resistance 34 which is in series with the secondary winding 29. Adjustment of this resistance will determine the amount of compounding as may be desired.

It is evident that the output voltage of the rectifier 30 will reflect changes in voltage of the supply mains; and by the connection of the terminals of the solenoid winding 4 to the direct current output terminals of the rectifier 30 as shown, the current supplied to the winding 4 will reflect any change in voltage of the supply mains 23 and correspondingly control the movement and position of the contactor 8 in the manner already described.

The use of any mechanical damping means is avoided and the parts are permitted to respond freely to any change in the required regulation to apply a rapid and pronounced corrective action; but this action is then quickly choked or counteracted to cause the parts promptly to assume their proper adjusted position without hunting. This is accomplished electrically by causing a counteracting impulse to be applied to the responsive controlling action. Referring to Fig. 9 it will be noted that the exciter field circuit extends from the negative terminal of the exciter armature through the field winding 26, field resistance 27 and regulating resistance 2 to the positive terminal of the exciter. A comparatively high adjustable resistance 35 is connected in a circuit from the positive terminal of the solenoid winding 4 to a point 35a between the regulating resistance 2 and the resistance 27; and the negative terminal of the winding 4 as regards the rectifier 30, is connected to the positive side of the regulating resistance 2 at the point 35b. It will thus be seen that a local anti-hunting circuit is established around the regulating resistance 2 which includes the anti-hunting resistance 35 in series with the regulating winding 4. In this manner any change in voltage drop between the terminals of the regulating resistance 2, as occurs in response to movement of the regulating element 8, causes a transient change in voltage applied to the circuit including the resistance 35 and winding 4; and, as this voltage opposes the voltage of winding 4 applied to it by the rectifier 30, such a change results in applying a counteracting voltage to the winding 4, either increasing or decreasing in value, as a result of the initial movement of the controlling element 8 in either direction. This transient counter effect thus tends to oppose any over-correction of the regulator and to bring the movable element to rest in its proper adjusted position. The amount of this corrective effect may be changed to a desired degree by adjusting the amount of resistance 35 in circuit and observing the action until a proper value of the resistance 35 is arrived at.

One form of means for overcoming the friction of repose of the movable element is shown in Fig. 9 wherein a make and break device is provided, subjecting the movable element to a slight vibration which will permit the movable element to respond readily to a change in the controlling current. For this purpose a small solenoid is indicated having a winding 36 of comparatively high resistance controlling a plunger 37 which latter carries a contact 38 adapted to engage another contact 39. One end of the winding 36 is connected to one terminal of the coil 4 and the other end to the contact 38, while the contact 39 is connected to the other terminal of the winding 4. A capacitor 40 is connected across the winding 36 so that when the contacts 38 and 39 engage, there will be a relatively heavier inrush of current and also for causing the capacitor to be charged when the contacts are separated for keeping the contacts separated a longer period of time. The solenoid 36 is preferably made small so that it requires less current to support it when raised than is required to raise it initially. This permits a capacitor of small capacity to be used. It is evident that the voltage applied to the controlling winding 4 will be applied to the winding 36 through the contacts 38, 39 and cause the plunger or armature 37 to separate the contacts 38, 39. Such opening of the circuit of the winding 36 will cause the contacts to reclose and this opening and closing is continued constantly. This superimposes upon the winding 4 a slight ripple wave and a slight vibration of the movable element of the apparatus of a character that is not sufficient to affect the regulation but keeps the device in a condition of suspended animation so to speak and thereby permits rapid and easy movement of the regulator to a new position in response to small change of controlling current in the winding 4. This sensitizer may be of any suitable form or character which will impose sufficient vibration on the apparatus to reduce the friction of repose.

The main generator may be operated without the utilization of the automatic regulator, in which case the switch 31 is opened. The solenoid coil 4 is thereby deenergized and the movable element 8 drops to its lowest position and short-circuits all of the resistance 2. The apparatus may then be operated without any automatic control, the generator field rheostat 25 and the exciter field rheostat 27 being adjusted in the usual manner to give the desired approximate voltage to the mains 23. During automatic operation it is desirable that the generator field rheostat be adjusted to the resistance-all-out position so as to minimize the load on the exciter. When passing to automatic operation the exciter field rheostat 27 should be adjusted to secure the approximate voltage on the lines 23 and the regulator control rheostat 32 should be placed in approximately mid-position. The regulator switch 31 is then closed and the exciter field rheostat is moved gradually to the resistance-all-out position which causes the regulator to assume control of the voltage of the main generator, the plunger 7 taking a position within the coil 4 corresponding with the voltage of the mains 23. The regulator control rheostat 32 is then adjusted to bring the voltage of the mains to the amount desired.

In considering the operation, the compounding device 33—34 may be disregarded as the same is used only when compounding is necessary. It should also be understood that the transformer 28—29 is not necessary when the voltage of the mains 23 is comparatively small, such as 125 volts or less. When this transformer is not needed, the leads which are connected to the secondary winding 29 may then be connected directly across a pair of the mains 23.

If the presence of the compounding means be disregarded, it is evident that a slight increase in the voltage of the mains above normal will cause the output of the rectifier 30 to increase and thereby increase the current supplied to the solenoid winding 4. This causes the plunger 7 to be moved further within the coil against the pressure of the spring 13. This action increases the amount of the resistance 2 in the field circuit of the exciter, decreasing the voltage of the exciter and decreasing the current in the field winding 22 of the generator which brings the voltage back close to normal. Similarly, a decrease in the voltage of the mains 23, such as caused by an increase in load, results in a decreased voltage being applied to the coil 4, permitting gravity together with the spring 13 to draw the plunger downwardly a slight amount and thereby reducing the amount of resistance in the field circuit of the exciter. This strengthens the voltage of the exciter and increases the current delivered to the generator field winding and brings the voltage of the mains 23 close to normal. The regulating action is brought about by a comparatively small movement of the element 8 and secures a refined adjustment of the voltage of the mains by reason of the structure and relationship of the parts, as already explained.

The anti-hunting means functions to counteract any over-correction of the voltage by reason of the fact that any change of adjustment is followed by a counteracting electrical impulse. Thus, when the voltage of the mains rises above normal and the movable element 8 is raised to insert more of the resistance 2 in circuit, the voltage drop across this resistance is thereby increased which increases the voltage in the local anti-hunting circuit comprising the resistance 35, effective portion of resistance 2 and solenoid winding 4. As the voltage of this local circuit is opposed to the voltage applied to the winding 4 by the rectifier 30, the increase in the opposing impulse tends to counter-act the increase of the voltage of the winding 4 imposed by the rectifier 30. Thus the movable element is quickly brought to rest in its proper adjusted position and hunting is avoided. When a decrease in voltage occurs on the mains 23 requiring automatic correction, the movable element 8 is moved downwardly and the amount of effective resistance 2 in circuit is reduced. This has the effect of reducing the voltage in the local anti-hunting circuit. This reduction of opposing voltage in the circuit of the winding 4 amounts to an increase of the effective voltage of the winding 4 which tends to raise the contacting element 8 and thereby counter-act the initial downward movement of the movable element so as to rapidly bring it to its correct adjusted position to meet the conditions of the generator circuit which required correction of its voltage.

The constant agitation or vibration of the regulator imposed by the vibrator already described, maintains the device in a condition so that it may smoothly and rapidly change its position as may be required due to the reduction of the friction of repose to a minimum. This further increases the sensitiveness of the apparatus.

When overcompounding of the voltage with increase of load is desired, the adjustable resistance 34 is connected in series in the supply circuit to the rectifier 30, as already described, and a voltage is applied thereto by the current transformer 33 which varies according to the load on the generator. This voltage is in such a direction, or so phased, as to oppose the voltage of the transformer secondary 29 derived from the voltage of the mains 23. The compounding action will be understood by first considering an increase in load. This increase will increase the voltage applied to the resistance 34 by the current transformer 33 and as the voltage applied thereto opposes the voltage imposed upon the circuit by the secondary 29, the result is to decrease the voltage supplied to the rectifier 30 and to the winding 4 further than the amount due to the decrease of the voltage of the mains 23 and thereby permit gravity and the spring 13 to draw the contact element 8 downwardly to a greater extent. This correspondingly decreases the amount of resistance 2 in circuit with the field winding of the exciter and thereby increases its voltage and increases the current delivered to the field winding 22 of the generator and thereby raises the voltage of the mains 23 above no-load voltage by an amount depending upon the load increase. Similarly a decrease in load causes the opposing voltage imposed upon the supply circuit of the rectifier to be decreased which results in an increase in voltage applied to the coil 4, raising the contactor 8 and increasing the effective resistance in the field circuit of the exciter and thereby reducing the voltage of the supply mains to accord with the decreased voltage required on the mains 23 for supplying current to the reduced load. It will be understood that this action is superimposed upon the normal action of the regulator which functions in the manner already described to maintain the voltage within close limits except as affected by the compounding means. The amount of compounding is secured by initially adjusting the amount of resistance 34 in circuit which may be found by changing from no load to full load until the proper amount of compounding is determined.

In passing from automatic operation to non-automatic operation, the exciter shunt field resistance 27 should first be increased to hold down the alternating current voltage of the mains when the regulator is turned off. The switch 31 may then be opened which will permit the contactor 8 to drop to its lowest position and short-circuit all of the resistance 2. The field rheostat of the exciter may then be adjusted to secure the approximate desired voltage of the mains 23.

Fig. 10 is similar to Fig. 9 except the anti-hunting connection is different and another method of compounding is disclosed, as well as a different form of sensitizer. Here the anti-hunting resistance 35 is connected from the upper positive terminal of the winding 4 to the point 35a; and the lower terminal of the winding is connected to the negative terminal of the field winding 26 by a wire 35c. It thereby applies an aiding voltage to the winding 4 which is dependent upon the change in current and the drop in volts of the shunt field winding 26 of the exciter. This will be understood by appreciating that the main controlling current of the winding 4 from the rectifier passes downwardly through this winding, while the anti-hunting circuit extends from the common positive upper terminal of the winding through the resistance 35 and field winding 26 to its negative terminal and then to the lower terminal of winding 4. Thus the anti-hunting circuit tends to pass a current downwardly through the winding 4 from its upper terminal to its more negative lower terminal and thus the voltage of this circuit aids the main voltage of this winding. It is thus apparent that any change of position of the movable contacting element 8 causing a change of current in the exciter field winding is followed by a counter-acting impulse to bring the movable element to its proper position. An adjustable resistance 41 is inserted between the negative terminal of the rectifier 30 and the connection 35c so as to maintain the voltage of the rectifier and prevent it from being adversely affected by changes in the voltage of the anti-hunting circuit. This resistance is adjusted to its proper amount for adaptation to the particular apparatus used and then may remain fixed.

The sensitizer of Fig. 10 is indicated as a buzzer 42, or similar vibratory device, mounted on the panel of the regulator for subjecting the parts to a mechanical agitation or vibration to minimize the friction of repose. It may be operated from any source and is shown as connected across the terminals of exciter with a resistance in series therewith.

The compounding means of Fig. 10 is accomplished by imposing upon the plunger 7 of the regulating winding 4, an opposing force which increases as the load increases and as determined by the value of the current in the exciter field circuit. Here a resistance 43 is inserted in this field circuit for deriving a voltage which will be dependent upon the value of the field current. Across the resistance 43 is connected a winding 44 which forms part of the solenoid affecting the plunger 7. This winding is wound in such direction as to oppose the main regulating winding 4.

The compounding action is superimposed upon the regulation for securing constant voltage and raises the voltage with increase in load. When the load increases and thus causes an initial drop in voltage on the mains 23, the plunger 7 will move downwardly and cause an increase of current in the exciter field circuit to bring the voltage back to normal in the manner already explained. This increase in current on the field circuit for securing this result increases the drop across the resistance 43 and the voltage and current in the auxiliary winding 44 and thereby increases the downward pull on the plunger 7. More of the resistance 2 is thereby cut out of the exciter field circuit and thus increases the voltage of the mains 23 the more the load is increased. Upon decrease of load the reverse effect takes place causing the voltage of the mains to be automatically adjusted to the lowest value at no load.

In Fig. 11 a different form of anti-hunting means is shown and a different manner of compounding. In this case resistance 45 is connected in series with the winding 4 in the output circuit of the rectifier and from a point between this resistance and the winding 7 a connection 46 is made to the positive terminal of the exciter armature and from a point between this resistance and the positive terminal of the rectifier 30 a connection is made to the negative terminal of the exciter armature through a capacitor 47. If it be assumed that the voltage of the mains falls slightly causing a decrease of current output from the rectifier, the regulator will cause the voltage of the exciter armature to be increased. This increase causes a momentary increase of charge to the condenser from the positive terminal of the exciter through the winding 4 and rectifier to the negative terminal of the exciter in a direction through the winding 4 additive to the rectifier current. This momentary impulse therefore tends to raise the initial fall of current in the winding 4 and so counteracts the initial downward movement of the plunger 7. When the voltage of the mains increases and raises the plunger and reduces the voltage of the exciter armature, this drop in volts causes a momentary discharge of the condenser 47 through winding 4 in a direction opposite to the rectifier current and so tends to reduce the current through winding 4 and counter-act the rise of current in the winding 4 and permit the plunger 7 to quickly assume its proper adjusted position.

The compounding means of Fig. 11 is the same as that of Fig. 10 except the winding 44 is subjected to the effects of change of current in the field circuit of the main generator instead of that of the exciter. Here the leads from the winding 44 are connected across a resistance in series in the circuit of the field winding 22. This resistance may for convenience be a portion of the field resistance 25 by tapping into the same as shown in Fig. 11 or an additional resistance may be provided for this purpose. The compounding action is similar to that described with reference to Fig. 10 and need not be repeated.

Figure 12:
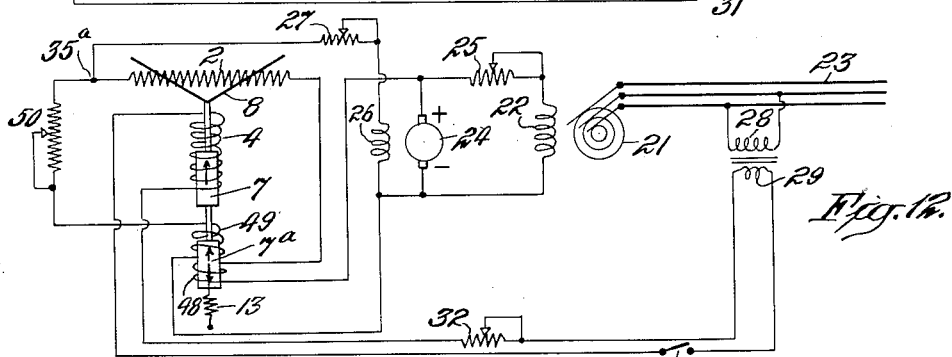

In Fig. 12 no rectifier is used, the power winding 4 of the regulator being subjected to an alternating current the value of which reflects the voltage of the mains 23. Thus the winding 4 is connected directly to the mains 23 or to secondary winding 29 through the switch 31 and control resistance 32. In this figure a different form of anti-hunting means is provided by the following structure. Mechanically connected to the plunger 7 but magnetically isolated therefrom is another core 7a. This is provided with a winding 48 which is connected in series in the shunt field circuit of the exciter as shown. It is wound around the core in a direction to oppose the upward pull of the winding 4. Another winding 49 is wound around the auxiliary core 7a and is connected in shunt to the exciter field winding 26 through a non-inductive resistance 50. The direction of turns of winding 49 are such as to oppose the effect of the winding 48 on the plunger 7a and to act with the pull of the winding 4. It may be assumed that the ampere-turns of the windings 48 and 49 are approximately equal or such as to have an equal and opposite effect under normal conditions. The winding 4 will then act in response to change of voltage of the mains 23 to regulate the same within close limits as already explained.

In order to understand the anti-hunting action of this form of the invention let it be assumed that voltage of the mains 23 falls below normal. This reduces the current in winding 4 and the plunger 7 drops somewhat to reduce the resistance 2 and increase the voltage of the field circuit of the exciter. This increase in voltage in the field circuit is quickly reflected in the anti-hunt circuit of the winding 49 and resistance 50 owing to its low inductance. It therefore exerts a momentary impulse on the core 7a tending to raise it and counter-act the fall of the plunger 7. Owing to the high impedance of the field circuit of the exciter the increase of current in winding 48 will lag in phase with reference to the current in winding 49, permitting the said momentary action. The delayed increase of current in winding 48 will, however, offset the raising of the core 7a by winding 49 and move it downwardly and bring the movable parts to their new adjusted position. When the voltage of the mains rises above normal the reverse action takes place, the change of current in winding 49 preceding that of the winding 48 and acting to impart an initial counter-acting impulse on the movement of plunger 7 to avoid hunting.

When it is desired to over-compound with the apparatus of Fig. 12, this may be accomplished by making the ampere-turns of winding 48 exceed those of winding 49, or in other ways causing winding 48 to have greater effect than winding 49. The compounding action will then be similar to that described with reference to Figs. 10 and 11.

Figure 13:
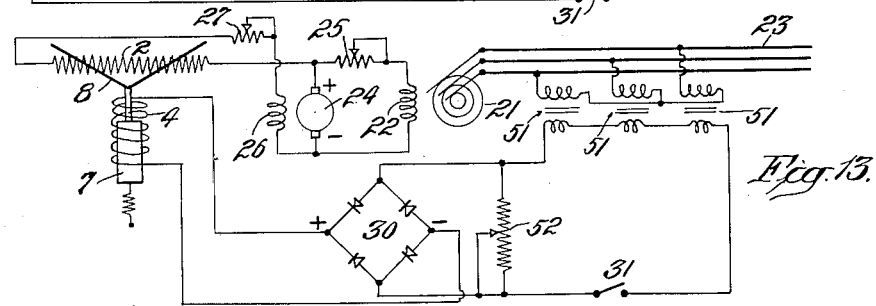

Fig. 13 is similar in general features to Fig. 9, except as to the means for producing the controlling voltage which is applied to the solenoid winding 4. Means is here provided for securing a controlling voltage which is dependent upon the average voltage of the three-phase mains instead of the voltage across a single pair of mains. Also the controlling voltage is greatly amplified in its range of change in comparison with the change in value of the voltage of the mains. In Fig. 13 three single phase transformers 51 are provided for deriving the controlling voltage from the mains. Their primaries are shown connected in star and across each of the three-phase mains respectively, while their secondaries are connected in a closed delta circuit with the rectifier 30 in series therewith. An adjustable resistance 52 is connected in shunt with the rectifier for adjusting the value of voltage at which the mains 23 are to be kept constant. The size of the core and the ampere-turns of the transformers 51 are related so that the cores are normally saturated in the region of the knee of the magnetization curve. With the construction of Fig. 13, any slight change in the average voltage of the mains 23 is greatly amplified in the circuit of the delta-connected secondaries because the voltage of the latter circuit is the result of the third harmonic of the frequency; and with the cores of the single phase transformer operating in the knee of the magnetization curve, the third harmonic voltage changes over a wide range for a comparatively small change in voltage of the mains. This wide range increases the sensitiveness of the apparatus and gives a pronounced corrective response to a comparatively slight change in voltage of the mains. The anti-hunting means, compounding and sensitizer may of course be applied to the apparatus of Fig. 13 if desired.

Figure 14:
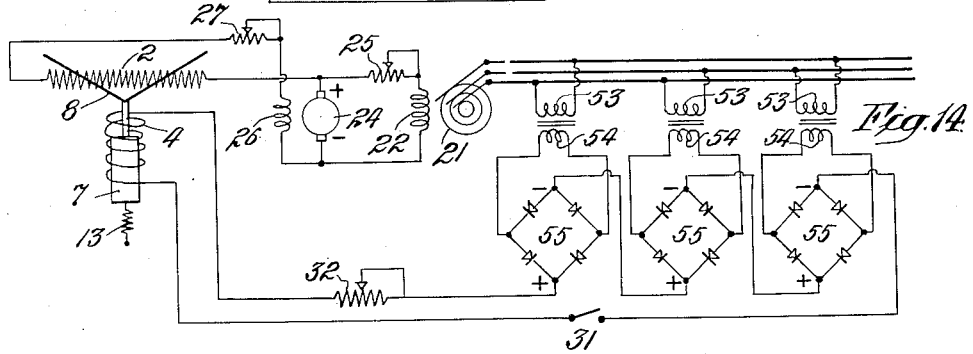

Fig. 14 is generally similar to Fig. 9 and shows another method of deriving a controlling voltage from the mains 23 which will be the average voltage of the three phases of the mains. Here the primary windings 53 of three single phase transformers or of a polyphase transformer are respectively connected across the three-phase mains, while the secondaries 54 are individually connected respectively to three rectifiers 55. The direct current output terminals of these rectifiers are connected in series with each other and to the solenoid regulating winding 4. It is evident that the controlling voltage applied to the winding 4 will be an average of the voltage of the three-phase mains at all times and secures a regulation corresponding thereto. This averaging of voltages is desirable where there is likely to be an unbalanced load on the different phases of the mains.

Figure 15:
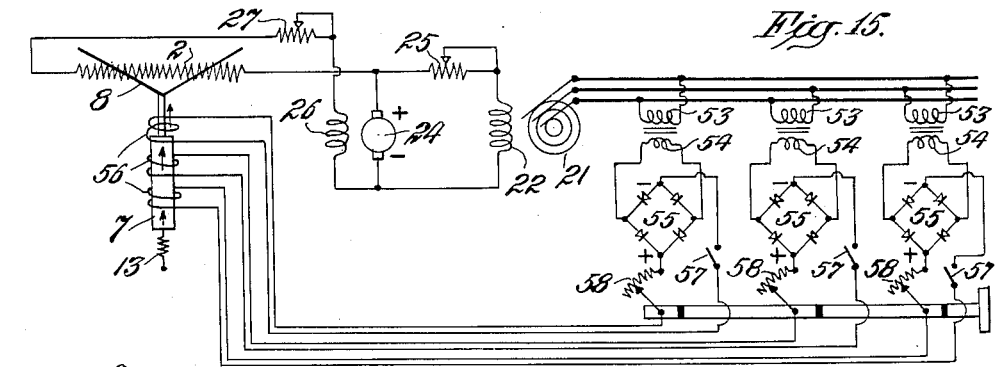

Fig. 15 is similar to Fig. 14 except that instead of applying a resultant voltage to the regulating winding 4 corresponding to the sum of the voltage of the mains, the sum of magneto-motive-forces corresponding to the voltages of the mains is applied to the plunger 7. For this purpose three individual windings 56 control the plunger 7, their magneto-motive-forces acting cumulatively. These windings are connected respectively to the three rectifiers 55 through a three-pole switch 57 and through respective resistances 58. A common rotatable shaft 59 simultaneously controls the adjustment of these resistances for the purpose of adjusting the regulated voltage of the mains 23 to the value desired to be maintained. Obviously the amount of the total magneto-motive-force exerted on the plunger 7 will correspond to the average of the voltages of the three-phase mains and secure regulation of their voltage in the manner already described.

Figure 16:
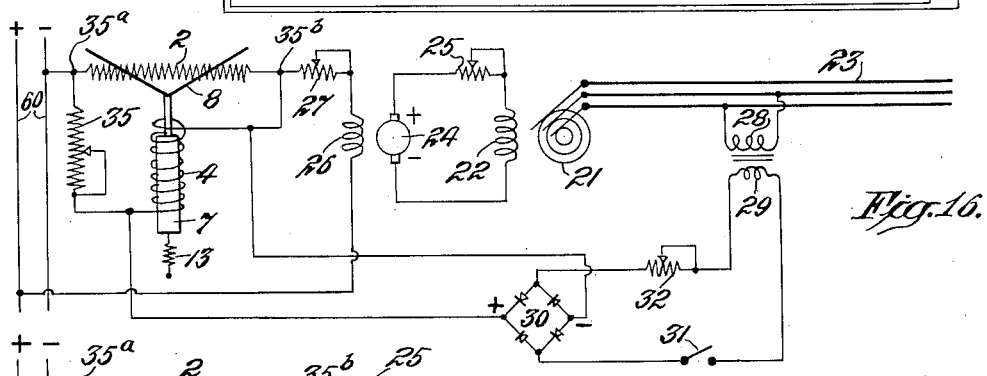

Fig. 16 is generally similar to Fig. 9 except instead of using a self-exciting exciter, its field winding 26 is energized from constant voltage mains 60 supplying direct current from any suitable auxiliary source. The method of regulation is similar to that described with reference to Fig. 9. The form of anti-hunting means is similar to that of Fig. 9 but any of the other means already described may be used.

Figure 17:
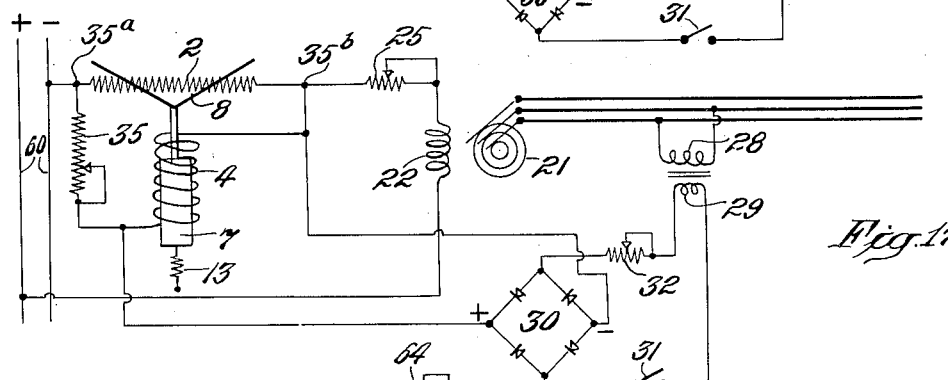

Fig. 17 shows an embodiment of the invention for regulating the voltage of the mains 23 wherein the field current of the main generator is derived from constant voltage means 60 supplying direct current, instead of using a separate exciter. Here the field winding 22 is connected across the mains 60 through the regulating resistance 2 and adjustable field rheostat 25. The operation is similar to that described with reference to Fig. 9 except the field winding 22 is controlled directly. The form of anti-hunting means of Fig. 9 is shown but any other may be used.

Figure 18:
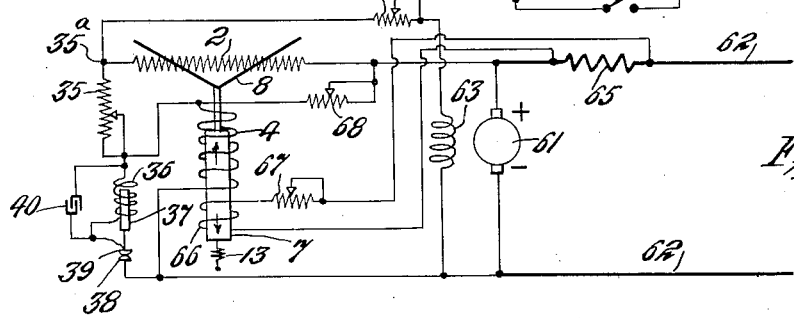

Fig. 18 shows the invention applied to a direct current self-excited main generator. The armature 61 of this generator supplies the mains 62. Its field winding 63 is connected from the negative terminal of the armature through a field rheostat 64 and through the regulating resistance 2 to the positive terminal of the generator. The compounding when desired may be accomplished by inserting a small series resistance 65 in one of the mains 62 and extending leads from its ends to an auxiliary winding 66 on the plunger 7. A resistance 67 is in series with this winding for adjusting the degree of compounding to the amount desired. The turns of winding 66 are wound in such direction as to oppose the main regulating winding 4. The latter winding is connected across the terminals of the main generator through an adjustable resistance 68. This resistance is for reducing the current in winding 4 to the proper amount for maintaining the desired voltages on the mains. The anti-hunting means is shown as the anti-hunting resistance 35 connected in a circuit through the winding 4 from the negative terminal of the main generator through the winding, then through resistance 35 to point 35a and then through the field winding 63 to the negative terminal and to the winding 4. Although the voltage of this circuit is in correspondence with the regulating voltage as regards direction, it will be understood that upon a decrease in voltage of the mains resulting in a decrease of resistance 2 for increasing the field current, the resulting increase in volts across the field winding will give an increase in volts through the anti-hunting circuit including winding 4 and thus apply an increase in volts to the winding 4 to counter-act the initial downward movement of the plunger 7. Upon an increase in voltage of the mains a reverse action takes place. Fig. 18 also shows a sensitizer comprising the parts 36 to 40 similar to that of Fig. 9 for superimposing a slight vibration upon the plunger 7 for reducing the friction of repose. The regulating and compounding action will be understood from explanations already made.

Figure 19:
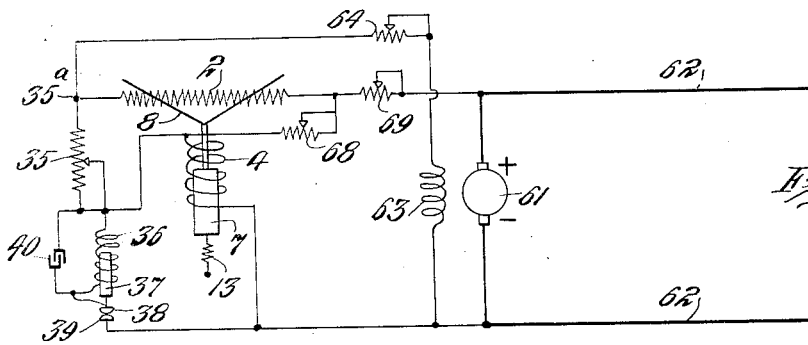

Fig. 19 is similar to Fig. 18 except the compounding when desired is secured in a different manner. Here a resistance 69 is inserted in series in the field circuit between the positive terminal and the regulating resistance 2 and the upper terminal of the winding 4 is connected through the adjustable resistance 68 to a point between the resistance 69 and the resistance 2. It is apparent that the current through winding 4 is responsive to change of voltage of the mains as modified by the drop in volts in resistance 69 determined by the strength of the field current. Thus upon increase in load the winding 4 is responsive to the reduced voltage of the mains which causes an increase in current in the field circuit which in turn further reduces the voltage applied to the regulating winding 4 due to the increased drop in volts in resistance 69 and further reduces the resistance 2 in circuit which further strengthens the field of the generator. This results in increasing the voltage of the mains over the normal no-load voltage with increase of load. When the load is decreased the reverse action takes place.

Fig. 20 shows a further embodiment of the invention for controlling the speed of an electric motor. A direct current generator 70 is shown supplying current to the constant voltage mains 71. The motor whose speed is to be controlled is shown having an armature 72 and a field winding 73. The armature is connected across the mains through a series resistance 74. The field winding is connected in shunt to the motor armature through the regulating resistance 2. The movable contact element 8a engaging this resistance, instead of being of upright diverging V form, is of inverted diverging V form. The regulating solenoid winding 4 is connected across the series resistance 74. The motor is shown as driving a spool or reel 75 on which is to be wound a wire, cable, rope or the like, from another reel 76, the cable 77 being shown passing from the outer part of the reel 76 to the inner part of the reel 75.

It is desired that in winding the cable on the reel 75, the pull on the cable shall be maintained constant. This means that as the diameter of the winding on reel 75 increases the motor speed must be reduced and the armature current kept constant. The resistance 74 is adjusted initially to give the desired current value. When the diameter of the winding on the reel 75 increases somewhat causing a slight increase in pull on the cable and a slight increase in the armature current, the drop in volts in the resistance 74 increases slightly and increases the current in the solenoid winding 4. This raises the plunger 7 and the contacting element 8a which reduces the resistance 2 in series with the field winding. This strengthens the motor field and reduces its speed and reduces the armature current close to its former value. As the winding continues, this regulating action continues gradually cutting out more and more of the resistance 2 and gradually reducing the motor speed until the reel is fully wound. The armature current is maintained approximately constant and the pull on the cable is kept substantially constant throughout the winding operation.

Where the load is constant, as in the case of a fan driven at a fixed speed, the apparatus of Fig. 20 will maintain the speed of the motor and fan constant regardless of change of voltage of the supply mains.

Fig. 21 shows apparatus for maintaining the motor speed constant regardless of change of load or other variable conditions. Here the motor armature 72 is shown driving a shaft and pulley 78 belted to another pulley 79 driving a shaft connected to the load. On the shaft of the armature is mounted a magneto-generator shown as having the permanent magnet driven within the stationary winding 80. The alternating voltage and current induced in this winding will vary in accordance with the speed of the motor armature 72. The winding 80 is connected to a rectifier 30, the direct current output thereof being supplied to the solenoid winding 4 through an adjustable resistance 81. This resistance may be adjusted for determining the desired fixed speed of the motor. The shunt field winding 73 of the motor is connected to the motor armature through the resistance 2.

It will be apparent that if from any cause the speed of the motor falls, the current supplied by the magneto-generator will decrease correspondingly, resulting in a decreased current in winding 4 permitting the plunger and contact bar 8a to move downwardly. This increases the amount of resistance 2 in series with the field winding, weakening the motor field and raising the speed of the motor back close to normal. If the motor speed rises above normal, the reverse action takes place.

It will be understood that any of the various forms of anti-hunting means and different forms of sensitizing means may be applied to the apparatus of Figs. 20 and 21 if desired. Also the invention may be applied to controlling the speed of a motor in various ways and to different types of motors and with an alternating as well as direct current supply and modified in various ways to fulfill various conditions.

Figure 22:
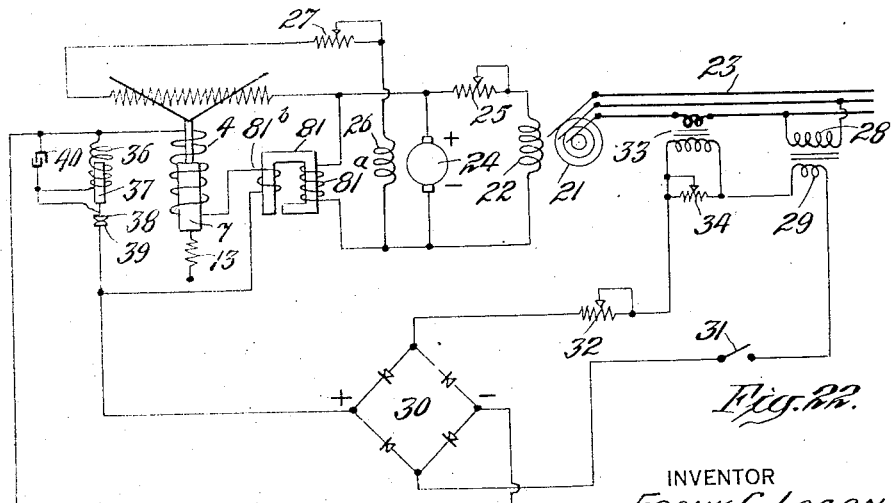

Fig. 22 is similar to Fig. 9 except in showing a different form of anti-hunting means. In Fig. 22 a small transformer 81 is shown having a primary winding 81a connected across the terminals of the armature 24 of the exciter. This primary winding is provided with sufficient resistance in the winding itself, or in its circuit to limit the current to a small safe value. The secondary winding 81b is connected in series with the solenoid winding 4. The core of this transformer is preferably provided with an air gap for keeping the inductance fairly constant and is designed so that it will be kept below the knee of the saturation curve. The secondary winding 81b is connected in series with the winding 4 in such a direction as to give the proper counteracting effect. Under normal voltage the flux in the core of the transformer remains constant by the direct current passing through the primary winding and no voltage is imposed upon the secondary winding by the transformer. When the voltage of the main generator falls, the decreased current in the controlling winding 4 permits its plunger to move to a lower position and strengthens the exciter field by removing a portion of the resistance 2 from the field circuit. The resulting increase in the exciter armature voltage causes a momentary increase of current through the primary winding 81a which results in a momentary increase of current in the secondary winding 81b and this winding is connected in such a direction in relation to the winding 4 as to impose an aiding momentary voltage in the circuit of the winding 4, tending to counter-act and dampen the downward movement of its plunger. The action is merely transitory and secures a desirable damping effect. Upon an increase of the voltage of the main generator above normal, the plunger of winding 4 is raised and results in decreasing the voltage of the exciter armature which decrease affects the transformer 81 to cause a momentary voltage to be imposed upon the secondary winding 81b in the reverse direction from that previously considered resulting in applying an opposing voltage in the circuit of the winding 4 and thereby tending to momentarily counter-act and check the upward movement of the plunger 7. Thus the damping effect is secured when the voltage of the main generator rises as well as when such voltage falls below normal.

Fig. 23 is similar to Fig. 22 except that instead of connecting primary winding 81a across the terminals of the exciter armature, it is connected in series in the field circuit of the exciter. The operation is similar to that described with reference to Fig. 22, it being apparent that upon an increase in the field current a momentary voltage will be imposed by the secondary winding 81b in the circuit of the controlling winding 4 tending to raise the plunger 7 and damping its movement and upon a decrease of current in the field winding a momentary voltage will be imposed by the secondary transformer in such direction as to oppose the upward movement of the plunger 7 and thereby dampen its action. The form of damping means shown in Figs. 22 and 23 may be applied to any of the other figures in place of the form of damping means shown in the other forms of the invention.

Fig. 24 is similar to Fig. 9 except the electrical damping means is replaced by an electro-mechanical form. In Fig. 24 a lever 82 is mounted upon a fixed pivot 82a and carries at its outer end a gear segment 82b which engages a pinion 82c. The other end of the lever 82 is pivotally connected to the spring 83 which in turn is connected to the lower end of the plunger 7. In this case the spring will be heavier or stiffer than the light spring 13 of the former figures. The pinion 82c is fixed to a shaft having a suitable bearing support and which also carries a thin disk 84 preferably made of aluminum for reducing its weight. This disk rotates between the poles of a fixed permanent magnet 85. In this form of damping means, the movement of the plunger 7 in either direction will actuate the lever 82 and drive the disk 84 in one direction or the other between the poles of the magnet causing the induction of eddy currents and thereby imposing a damping effect upon the movement of the plunger 7. This form of damping means may be applied to any of the other figures of the drawings, although its action is more sluggish.

Fig. 25 is likewise similar to Fig. 9 except the electrical damping means is replaced by mechanical damping means. In this form the stiff spring 83 is connected to a piston 86 movable within a fixed dash-pot cylinder 86a. A screw 86b is located in the bottom of the cylinder for providing an adjustable air vent between the exterior and interior of the dash-pot. A light bag 87 of oiled silk or of rubber or other material is provided for enveloping the dash-pot and spring and secured at its upper end to the lower end of the plunger 7 for protecting the device from dust and moisture. The flexibility of the bag permits relative movement of the plunger 7 with reference to the fixed portion 86a of the dash-pot. Upon movement of the plunger 7 in either direction in its controlling action, the dash-pot being connected to the stiff spring 83 tends to dampen its action by the comparatively slow permissible movement of the piston of the dash-pot. This form of damping means may be applied to any of the other figures of the drawings in place of the damping means disclosed in the various figures, where the more sluggish action is not objectionable.

Many other modifications and applications of the invention may be made according to the conditions and the particular requirements. The compounding means may or may not be used and when not used the regulator will act to maintain the voltage of the generator constant within close limits. The different means of compounding described may be applied to various embodiments of the invention other than in the particular combination shown. The different anti-hunting means may likewise be applied to various embodiments other than the particular combinations shown. Likewise different forms of sensitizers may be used in the various combinations to give a slight agitation or slight vibration to the movable regulating element. For example, a relaxation oscillator might be connected to the terminals of the regulating winding 4; a very small motor driving an eccentric might be used for imparting a slight vibration or agitation to the movable element; and various other means for imposing a slight vibration might be used, particularly where the current in the regulating winding 4 is a direct current. In some cases the alternating current derived from the main generator when of the alternating current type, may be applied directly to the regulating winding 4 instead of rectifying this current, as the regulator is operable when supplied with alternating current. Instead of regulating the voltage of a generator or controlling the speed of a motor, the movable element and associated contacts might be used for other controlling purposes where a large range of control and refined adjustment is desired to be accomplished by a comparatively short range of movement of the adjustable element.

I claim:

1. The combination of a dynamo-electric machine and controlling apparatus comprising a controlling field winding, means having relatively adjustable contacts maintained in continuous slidable engagement for affecting the current in said field winding, an electromagnet having a winding subjected to change of controlling current derived from said machine and having a movable element for slidably adjusting the relative contacting position of said contacts for affecting said field winding for counter-acting the cause of said change, and means for imposing upon said element a continuous slight vibration for overcoming the friction of repose of the engaged contacts.

2. The combination of a dynamo-electric machine and controlling apparatus comprising a controlling field winding, means having relatively movable parts maintained in continuous slidable engagement for affecting the current in said field winding, an electromagnet having a winding subjected to change of controlling current derived from said machine and having a movable element for slidably adjusting the relative engaged position of said parts for affecting said field winding for counter-acting the cause of said change, and means for imposing upon said element a continuous slight vibration for overcoming the friction of repose of the engaged parts.

3. The combination of a dynamo-electric machine and controlling apparatus comprising a controlling field winding, means having relatively adjustable contacts maintained in continuous slidable engagement for affecting the current in said field winding, an electromagnet having a winding subjected to change of controlling current derived from said machine, a movable element controlled by said electromagnet winding for slidably adjusting the relative engaged position of said contacts for affecting the current in said field winding for counter-acting the cause of said change of current, and means for imposing upon the circuit of said electromagnet winding a continuous slight change in value for in turn imposing on said element a continuous slight vibration for overcoming the friction of repose of the engaged contacts.

4. The combination of a dynamo-electric machine and controlling apparatus comprising a controlling field winding element, an electromagnet subjected to change of controlling current derived from said machine, an adjustable resistive element connected in series with said field winding element in the field circuit and controlled by said electromagnet for adjusting said resistive element for counter-acting the cause of said change of current, and anti-hunting means in a circuit connected in shunt across only one of said elements and responsive to change of voltage drop in said last named element for imposing a transient counter-acting change on said electromagnet.

5. The combination of a dynamo-electric machine and controlling apparatus comprising a controlling field winding element, an electromagnet having a winding subjected to change of controlling current derived from said machine, an adjustable resistive element connected in series with said field winding element in the field circuit and controlled by said electromagnet for adjusting said resistive element for counter-acting the cause of said change of current, and anti-hunting means in a circuit connected in shunt across only one of said elements and responsive to change of voltage drop in said last named element for imposing a transient counter-acting change of voltage on said electromagnet winding.

6. The combination of a dynamo-electric machine and controlling apparatus comprising a controlling field winding, an electromagnet subjected to change of controlling current derived from said machine, an adjustable resistive device connected in series with said field winding in the field circuit and controlled by said electromagnet for adjusting said resistive device for counter-acting the cause of said change of current, and anti-hunting means in a circuit connected in shunt across said adjustable resistive device only of said field circuit and responsive to change of voltage drop in said resistive device for imposing a transient counter-acting change on said electromagnet.

7. The combination of a dynamo-electric machine and controlling apparatus comprising a controlling field winding, an electromagnet subjected to change of controlling current derived from said machine, an adjustable resistive device connected in series with said field winding in the field circuit and controlled by said electromagnet for adjusting said resistive device for counter-acting the cause of said change of current, and anti-hunting means in a circuit connected in shunt across said field winding only and responsive to change of voltage drop in said field winding for imposing a transient counter-acting change on said electromagnet.

8. The combination of a dynamo-electric machine and controlling apparatus comprising a controlling field winding, a resistive device in circuit with said field winding having continuously engaged variable contacts for affecting the resistance of said device, an electromagnet having a winding subjected to change of controlling current derived from said machine and having a movable element for variably affecting said device for counter-acting the cause of said change, and means for imposing upon said device a continuous slight vibration for overcoming the repose of said engaged contacts.

9. The combination of a dynamo-electric machine and controlling apparatus comprising a controlling field winding, a resistive device in circuit with said field winding having continuously engaged variable contacts for affecting the resistance of said device, an electromagnet having a winding subjected to change of controlling current derived from said machine and having a movable element for variably affecting said device for counter-acting the cause of said change, and means for imposing upon the controlling apparatus a continuous slight vibration for overcoming the repose of the controlling parts.

FRANK G. LOGAN.